United States Patent [19]

Hayashi et al.

[11] 3,874,981

[45] Apr. 1, 1975

[54] RESIN SHEET HAVING AN APPEARANCE OF CARPET OR VELVET AND PROCESS THEREFOR

[75] Inventors: Motoshige Hayashi, Tawaraguchi; Mikio Kukumura; Zengo Sano, both of Nara, all of Japan

[73] Assignee: Sekisui Kaseihin Kogyo Kabushiki Kaisha, Nara-shi, Japan

[22] Filed: July 14, 1972

[21] Appl. No.: 271,689

[30] Foreign Application Priority Data

July 14, 1971 Japan.............................. 46-52547

[52] U.S. Cl...................... 161/62, 161/67, 161/159, 225/2, 225/3, 264/45, 264/54, 264/47
[51] Int. Cl...................... B32b 5/18, B32b 31/00
[58] Field of Search....... 161/62, 67, 159, 160, 161; 264/45, 51, 53, 54, 176 R, 47; 225/2, 3, 6

[56] References Cited

UNITED STATES PATENTS

| | | | |
|---|---|---|---|
| 3,483,602 | 12/1969 | Mizell................................... | 161/62 |
| 3,709,752 | 1/1973 | Wistozky.............................. | 161/67 |

*Primary Examiner*—Marion E. McCamish
*Attorney, Agent, or Firm*—Armstrong, Nikaido & Wegner

[57] ABSTRACT

The present invention provides a process and a resulting product wherein the process relates to preparing a resin sheet having an appearance of carpet or velvet wherein a polyolefin or polyamide is admixed with a foaming agent and the resulting mixture is extruded into a sheet, characterized in that the sheet extruded from a die mounted on an extruder is immediately introduced into an enclosed channel or passageway without allowing the sheet to be exposed to the air, with the sheet then being maintained under such conditions that the front and reverse sides of the sheet are held at such a temperature lower than that of the intermediate layer thereof and such that the sheet is not allowed to expand excessively in the direction of its width but is allowed to expand substantially exclusively in the direction of its thickness, whereby a sheet is produced with a core or intermediate layer of which has been well foamed and the pore walls of which have been broken or fragmented, with the sheet being finally split into two sheets along the middle part of the direction of its thickness.

6 Claims, 10 Drawing Figures

3,874,981

RESIN SHEET HAVING AN APPEARANCE OF CARPET OR VELVET AND PROCESS THEREFOR

DETAILED EXPLANATION OF INVENTION

This invention relates to a resin sheet having an appearance of carpet or velvet which is prepared by extruding crystalline thermoplastic resin such as polyolefin or polyamide containing foaming agent to form a foamed sheet having a specific structure and peeling off or splitting the sheet into two sheets. This invention also relates to a process for preparing the resin sheet having an appearance of carpet or velvet.

Generally, to manufacture a synthetic resin sheet having a multiplicity of small projections which resembles a carpet or velvet, it has heretofore been necessary to provide a mold which has the corresponding structure. For example, in order to produce a carpet-like sheet of synthetic resin, it has been thought to be necessary to shape the softened resin in the mold as in injection molding or compression molding, or to prepare at first a flat resin sheet and then to emboss the sheet. However, by any of these processes, it has been impossible to obtain a sheet having a multiplicity of small projections such as a carpet. This is because it is not easy to build a mold having such a multiplicity of small projections on its surface and, even if such a mold could be built, it could not be easy to fill the mold with the resin to every nook and corner. Moreover, if one could succeed in filling the mold with the resin, it would be impossible to release the resin from the mold while keeping the shape as it is.

On the other hand, extruding processes are adapted for use in preparing a shaped article which has a fixed shape in cross section. Therefore, it has been considered to be impossible to prepare, by the extruding process, a sheet which has a multiplicity of small projections on its surface as seen in a carpet or velvet.

Under such circumstances, we have discovered that a sheet having peculiar features can be obtained by extruding a foamable polyolefin through an orifice of a die mounted on an extruder and through a channel having a specific passageway which communicates with the orifice. This sheet has two unfoamed or slightly foamed surface layers and a foamed intermediate layer. The foamed intermediate layer was in a state such that it was foamed to a gradually increasing degree towards the middle of its thickness direction, and in the middle portion, pore walls were fragmented in such a manner that the pore walls in said middle portion exist in the fashion of narrow tape or threads each oriented in the thickness direction of the sheet. The sheet is such that it can be easily peeled off into two pieces along the middle portions in the thickness direction of the sheet. Accordingly, we split the sheet into two sheets, and found that the split surfaces had dense tufts which were formed from said tapes or threads and projecting from the base sheet and that the surfaces resembled those of carpet or velvet. The present invention is based upon the above findings.

The invention provides a process for preparing a resin sheet having an appearance of carpet or velvet wherein polyolefin or polyamide is admixed with a foaming agent and the resulting mixture is extruded into a sheet, characterized in that the sheet extruded from a die mounted on an extruder is immediately introduced into an enclosed channel or passageway without allowing the sheet to be exposed to the air, the sheet is then maintained under such conditions that the front and reverse sides of the sheet are held at a temperature lower than that of the intermediate layer thereof and such that the sheet is not allowed to expand excessively in the width direction but is allowed to expand substantially exclusively in the thickness direction, whereby a sheet is produced whose core or intermediate layer has been well foamed and whose pore walls have been broken or fragmented, and finally said sheet is split into two sheets along the middle part of the thickness direction.

It is well known to manufacture a foamed sheet by the steps of admixing a thermoplastic resin with a foaming agent, extruding the resulting mixture or compound from an extruder die in a short form. It is also established practice to provide a pair of opposing plates adjacent to an extruder die in such a manner that said pair of plates form a gradually enlarged passageway, wherein internal opposing walls of said plates form a concave surface and the zone defined by said concave surfaces are maintained at low temperature and pressure, and the sheet emerging from the die is allowed to expand as it proceeds along the passageway. These processes aim at manufacturing flat, smooth foamed sheets. However, an ancillary equipment such as the pair of plates is such that the resulting passageway is also gradually enlarged in the width direction, therefore the methods provide sheets which have been expanded also in the width direction. Furthermore, the concave walls provides a gradually enlarged cross-sectional area and does not provide any reduced cross-sectional area in the course to its terminal. The resulting sheet is predominantly foamed inside, and the cells are oriented in the thickness direction of the sheet. However, the resulting sheet is not so foamed that the cells in the intermediate layer are broken or to the extent that the sheet can be easily split into two sheets.

In contrast, in the method of this invention, the sheet emerging from the die is allowed to expand substantially exclusively in its thickness direction, with the result that the sheet is prevented from expanding in the direction of its width. In this aspect, the method of this invention can be different from the conventional art hereinbefore briefly described. In addition, the method of this invention is such that the sheet emerging from the die is first allowed to expand abruptly in the direction of its thickness and, then, the thickness so increased is maintained or the sheet is held in such a manner that said thickness will be only slightly reduced. In this aspect, the method of this invention is different from the above-described conventional techniques. In accordance with this invention, therefore, both surfaces of the sheet are substantially gas-impermeable, with its internal or intermediate layer being such that its cells have been broken to render the layer highly gas-permeable.

This invention is accordingly directed to a method for manufacturing a sheet having an appearance of carpet or velvet characterized by: the step of providing a linear or annular orifice at the resin-discharge end of a die; the step of supplying a foaming agent-containing polyolefin or polyamide resin to the die; the step of extruding said resin through said linear or annular orifice to form a flat or tubular sheet; the step of guiding the sheet directly into a cooled passageway without allowing the sheet to be exposed to the atmosphere, said passageway being shaped so that it will not substantially alter the width or diameter of the flat or cylindrical sheet and being of the dimension which is three or more times the thickness of said sheet throughout, the manner of this enlargement being such that the thickness is abruptly increased 3 or more times up to one-half of the length of the passageway from the inlet to the exit end thereof and is maintained constant or gradually reduced up to the remaining one-half, the surfaces of the sheet within said passageway being cooled in the meantime, the sheet being expanded by the foaming agent contained therein predominantly in the direction of its thickness, the step of guiding the sheet out from the passageway to allow it to expand further, thereby producing a foamed sheet; and the step of splitting said foamed sheet into two sheets along the middle of its thickness.

This invention will be clearly understood by the following explanation and drawings: in the drawings:

FIGS. 7 and 8 are respectively vertical section of another embodiment of the invented method, in which FIG. 8(b) is a horizontal section of FIG. 8(a).

Figure 5:
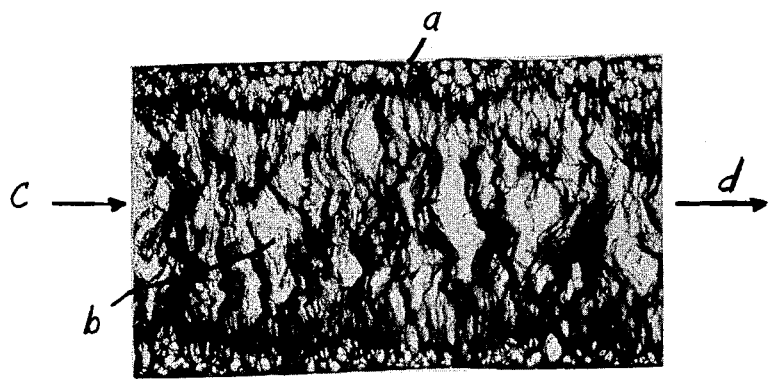
FIG. 5 is an enlarged photograph of an cross-section of an extruded sheet obtained by the invented method, the sheet being in the stage before the extruded sheet is split into two sheets, and the cross-section being perpendicular to the extruding direction.

In the method above described, the extruded sheet to be split in the above manner has a novel construction. As is shown in FIG. 5, the extruded sheet is identical with the conventional product in that it has two surface layers $a$ which have not substantially foamed and one foamed intermediate layer $b$, however, the intermediate layer according to this invention has a unique structure. This intermediate layer is such that it is gradually highly foamed progressively towards the middle of thickness, featuring larger cells which, also, have been stretched in the thickness direction of the sheet. Furthermore, in the neighbourhood of the middle of sheet thickness, the cells have been broken to provide one of the so-called open-cell structures. More specifically, the cell walls have been fragmented and exist as narrow strips of thin films or threads oriented in the thickness direction. These strips of films or threads are narrowest in width at the middle of sheet thickness and, at times, have been cut off there. Therefore, this sheet is of such a structure as can be easily split across the middle of its thickness. In respect of being ready to be split, this sheet according to this invention is distinct and novel.

The fact that the sheet according to this invention has such unique structure has been confirmed by its permeability to gases. Generally, foamed sheets made by extrusion have the so-called closed-cell structure and are impermeable to gases. However, the present sheet, which is also manufactured by way of extrusion, contains open cells in its intermediate layer, with the result that it has a reasonable degree of gas-permeability in the direction normal to its thickness, though it is substantially gas-impermeable in the thickness direction because its surface layers $a$ have slightly been foamed or substantially unfoamed. This gas permeability can be easily ascertained by applying one's mouth to the sheet and taking a breath. For example, referring to FIG. 5, if one blows in the direction marked by arrow $c$, the breath finds its way in the direction marked by arrow $d$, attesting to the fact that the sheet is gas permeable.

The gas permeability of sheets manufactured by any extrusion technique can be approximated from its water absorption. To measure the water absorption of a sheet, a sample measurings 100 by 100 millimeters is cut out from the sheet and immersed in a 0.01 percent aqueous solution of sodium dodecylbenzenesulfonate for 24 hours and the water content of the sample is then measured. The gas permeability of the sheet made by the extrusion method of this invention has also been confirmed by the following experiment. First, a small specimen of predetermined width is cut out from the sheet and the permeability of this specimen to methanol was measured in various direction. The result of this experiment has shown that whereas the specimen was completely impermeable to methanol in the thickness direction from the face toward the reverse side or vice versa of the sheet, a large amount of methanol permeated through the specimen in the direction normal to the thickness direction. The amount of passage of methanol provides a measure against which the degree of fragmentation of the cells can be ascertained. Therefore, the sheet can be more easily split into two sheets when it is more permeable to methanol. According to the result of the same experiment, the sheet through which 15g or more of methanol passed per centimeter during a period of 10 minutes could be easily split into two sheets of substantially equal thickness and, upon splitting, yielded satisfactory rug-like or velvety sheets. In particular, the sheet which have a methanol permeability of 50g or more per centimeter during a period of time of 10 minutes yielded especially good sheet.

Figure 9:
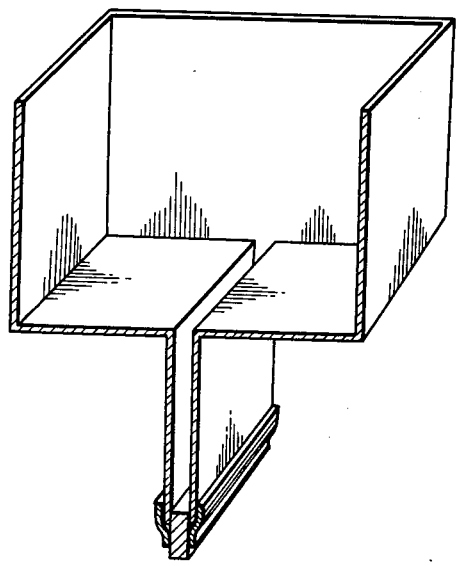
FIG. 9 is an askance view of an instrument for measuring methanol permeability, wherein a part of the instrument is vertically cut away.

Specifically, the above methanol permeability of the sheet was measured in the following manner. As regards the measuring apparatus, use was made, as illustrated in FIG. 9, of a rectangular container measuring 100 by 100 millimeters and 70 millimeters deep in inside dimensions. In the bottom of this container, there was provided a slit which had a suitable width and a length of 100 millimenters and, under the slit, a rectangular passage 50 millimeters long was attached, the cross section of the passage being equivalent to the size of the slit. A small specimen of the sheet was inserted into the downward portion of the passage and 500 cc of methanol was placed in the above container. The amount of methanol which had emerged through the specimen during a period of time of 10 minutes was weighed. As the sample sheets, those measuring 3 to 6 millimeters in thickness were employed and, with the thicknesses being left unchanged, a specimen measuring 100 millimeters in length and 10 millimeters in width was cut out from each of the samples. In attaching such a specimen to the downward end of the above passage, it was so arranged that the face and reverse sides of the sheet face in the direction of dripping of the methanol and one end of the specimen was inserted into the passage. In inserting the specimen, care was used not to allow the passage wall to compress the specimen by filling in paraffin around the specimen and applying an adhesive tape to the gap so that the methanol would not flow through the gap. The amount of effluent methanol measured in this manner was converted to the amount of permeability per centimeter of the specimen during a period of 10 minutes. This amount was used as the permeability unit.

It should be noticed that the unsplit sheets according to this invention generally measure 2 to 20 millimeters in thickness, perferably from 4 to 8 millimeters, with their degree of expansion being from 10 to 40 times, preferably from 10 to 25 times.

Figure 6:
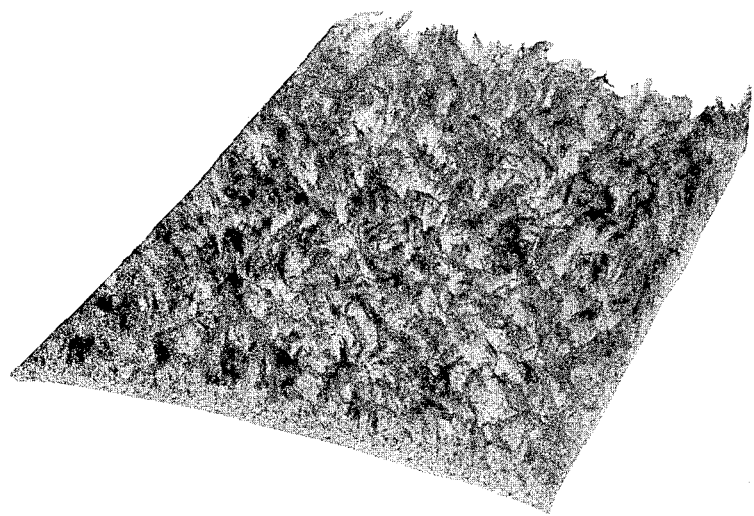
FIG. 6 is an obliquely viewed photograph of the invented sheet, in which a surface obtained by splitting an extruded sheet is directed upwards.

As shown in FIG. 5, the above sheet according to this invention is such that its external layers (a) remain unfoamed but its intermediate layer (b) has been foamed. Moreover, since the cells in the middle of its thickness have been ruptured, the present sheet can be easily split or peeled off into two pieces of substantially equal thickness. This splitting, in extreme cases, can be easily effected by hand even when the width of the sheet is above meter. Upon splitting, the faces created thereby have a dense population of tufted projections, presenting an appearance resembling the surface of a carpet, rug or velvet. Thus, as shown by the photograph of FIG. 6, the surface has a multiplicity of randomly arranged projections each standing upright. This multiplicity of small projections appears as if they had been produced by electrostatic deposition. It was a surprising discovery that such surfaces could be created by the simple steps of extruding a foamable resin composition and subsequently splitting the resulting sheet.

The sheet can be split whether by hand or by means of a mechanical slicer. When manual splitting has been carried out, the said small projections are relatively long, with their lengths being variegated and, in extreme cases, presenting a fur-like appearance. When the projections vary in length, if a sheet measuring 4 millimeters in thickness is split into two pieces of substantially equal thickness, each of the resulting pieces appears as if it had a thickness of about 3 millimeters. On the other hand if the sheet is split by means of a mechanical slicer, the said small projections are cut in half so that the resulting face assumes an appearance approaching that of a velvet.

The small projections which are obtained upon splitting the sheet into two pieces of substantially equal thickness have been those produced as, in the sheet foamed, it expanded mostly in the direction of its thickness. As the sheet emerging from the die is allowed to expand in the direction of its thickness, the cells are elongated in the thickness direction of the sheet. When this degree of elongation is considerably high, the cell walls are highly oriented. When this orientation is further increased, the cell walls are ruptured at various points to yield tapes of film extending in the thickness direction of the sheet. The tapes of film thus formed are cut midway to yield the above-described small projections. It is for this reason that the projections stand upright from the base sheet portion in high density. Moreover, since these projections are integral with the base sheet portion, they are not readily removed when rubbed by hand. Furthermore, because the projections have been oriented, they have a high tensile strength. The projections are as if they had been manufactured by electro-deposition or flocking, they have a warm feeling to the hand. Therefore, the present sheet can be used in many application including a rug or other covering material or as a packaging material.

As a mode of use of the sheet according to this invention, one may apply pressure-sensitive adhesive to the smooth surface of the sheet so that it may be easily adhered to other materials. The term pressure-sensitive adhesive means such an adhesive as will adhere any two substrate materials together when said materials are pressed with the adhesive being sandwiched therebetween. An example of the above adhesive agent is one used for cellophane adhesive tapes. Such a pressure-sensitive adhesive is dissolved in a solvent, then the solution is applied to the smooth, flat surface of the sheet, and thereafter the solvent is evaporated, leaving a layer of said pressure-sensitive adhesive.

To the sheet carrying such a layer of pressure-sensitive agent, there is applied a sheet of paper which can be easily released from the adhesive and, in use, the sheet of paper is stripped off. Then, one may conveniently adhere the sheet to another material. An example of the easily-releasable paper is a kraft paper one face of which carries a coating of polyvinyl alcohol or silicone resin. If the coated face of the paper is pressed against an adhesive agent, it will adhere to the adhesive agent but the resulting bond strength is not so high that it can be readily stripped off. Therefore, the resin sheet carrying such a releasable sheet of paper is convenient, because in use it can be easily bonded to any desired surface. The present sheet of this type can be used as a wall material in the housing industry or as a cushioning material which is to be applied to the inside wall of a container.

The following description will be directed to the method for manufacturing the sheet which has hereinbefore described in detail. The nozzle or die to be attached to the forward end of an extrusion for the manufacture of sheets is such that it is provided with a linear or annular orifice at the resin discharge end. As said nozzle or die, one may expediently employ one which is generally used in forming a flat or tubular sheet. The resin to be fed into said die is a polyolefin or polyamide resin containing a foaming agent. The foaming agent may be incorporated when the resin is in a hot, melted condition within the extruder or, alternatively one may previously compound the same with the resin. As the resin, one may use a crystalline resin such as polyolefin or polyamide. As for the polyolefin, one may employ not only the homopolymers of ethylene or propylene but also the corresponding copolymers. As for polyamide, it is also the case. For example, the copolymers of olefin and vinyl monomers such as the copolymer of ethylene with vinyl acetate and that of ethylene with vinyl chloride can be conveniently utilized. One should of course notice that these copolymers should be such that their olefin units or amide units account for more than a half by weight. Of these polyolefin and polyamide resins, polypropylene, high-density polyethylene and Nylon 12 (trade mark) are the most preferred. In particular, polypropylene is the most desirable material.

As the foaming agent, one may employ the following. An example is a volatile liquid which boils at a temperature below the softening point of the polyolefin or polyamide resin to be employed. Another example is a compound which evolves a gas upon decomposition at a temperature above the above-mentioned softening point. Preferred examples of said valatile liquid are such hydrocarbons as propane, butane and pentane and such halogenated hydrocarbons as freon gas. As said compound which gives rise to a gas upon decomposition, one may employ such compounds as azobisformamide.

To improve the foaming of the polyolefin or polyamide resin, one may incorporate an auxiliary foaming agent in addition to the above-mentioned foaming agent. Aside from these additives, one may, if desired, incorporate such additives as a pigment, dye, flame retarder, electric-charge preventing agent and the like. As the auxiliary foaming agent, one may employ talc or a mixture of sodium bicarbonate and citric acid.

When the crystalline resin-foaming agent composition is extruded from the die, the resin immediately foams as it emerges from the die orifice to expand. This expansion would take place not only in the thickness direction of the sheet but also in the width or transverse direction. Therefore, in the present invention, a hollow unit is directly attached to the die, said unit communicating with said die orifice, so that the resin emerging from the die may flow into and through the passageway defined by said hollow unit. This passageway is of a shape such that the sheet may expand exclusively in the direction of its thickness and a provision is made such that a cooling medium may circulate to cool the resin adjacent the wall of the passageway.

As the wall of the passageway is cooled, the surfaces of the resin sheet moving throught the passageway are cooled so that they are either substantially unfoamed or, even if they foam, provide surface layers of low foaming factor on the sheet. At the same time, as the passageway is enlarged in the thickness direction of the sheet, the sheet foams in its intermediate layer. To ensure that this internal foaming may take place efficiently in the thickness direction, it is so arranged that the sheet will not substantially be altered in width. Thus, when the die gap or orifice is linear, the passageway is so arranged that the width is substantially not altered but the thickness of passageway is of a dimension such that it is three or more times that of the die orifice. When the die orifice is annular, the diameter of the passageway is substantially not altered but only the thickness of the passageway is increased to three or more times that of the die orifice.

That the above width or diameter is substantially not changed does not mean that the dimension in the width direction of the resin sheet is not altered at all but means that a minor alteration is permissible. Since what is needed is to orient the cells of the resin sheet predominantly in the direction of its thickness, it is also permissible to reduce the width of the resin sheet. As to enlargement, a minor degree of enlargement is tolerable. The permisssible degree of enlargement of the passageway is usually within the range of 30 percent and, preferably, 20 percent, relative to the width of the orifice exit. It should be noticed, however, that one should avoid using a passageway which is completely open in the width direction.

The above-mentioned enlargement of the passageway in the thickness direction is effected in the portion near the inlet end of the passageway, that is to say in the vicinity of the die orifice. At and near the exit end of the passageway, there is no enlargement at all in the thickness direction. Rather, the passageway is gradually constricted or reduced in the thickness direction of the sheet or, alternatively, remains unchanged. The shape of the passageway is selected mainly with reference to the fusing characteristics of the particular crystalline resin to be employed. This is because, being fusible within a rather narrow temperature range, crystalline resins tend to become abruptly difficult to modify in shape once they have started coagulating. Thus, because of the extreme ease of crystallization of the resins, it is necessary to make the shape of the passageway as described above. The enlargement near the inlet end is effected up to one-half of the entire length of the passageway and, in the remaining zone, i.e., at the exit side, the passageway is not enlarged. If the thickness of the passageway is reduced at the exit side thereof, the thickness should be more than 3 times the thickness at the inlet end.

Figure 1:
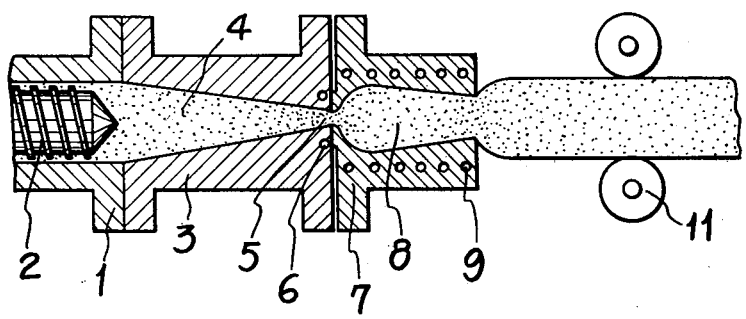
FIG. 1 is a vertical section showing diagrammatically a part of an apparatus used in the invented method.

A typical shape of the above passageway will be described below. First, if the die orifice at the resin discharge end is extending linear horizontally, the longitudinal cross section of the die and passageway is as illustrated in FIG. 1. Referring to FIG. 1, the numeral 1 indicates an extrusion apparatus and 2 its screw. The reference numeral 3 indicates a die or nozzle; 4 a passageway for resin within the die; and 5 is a die orifice or gap. Indicated at 6 is a passageway through which a heating medium flows, said passageway being provided for the purpose of heating the die orifice 5. The numeral 7 indicates a channel member disposed adjacent to the die; 8 indicates a passageway for resin which is formed within and defined by said passageway member 7, the resin passageway 8 being greater in thickness at any point than the die orifice 5 if one views it in vertical section with respect to the direction of flow of the resin. The length of the resin passageway in the direction perpendicular to the drawing is substantially identical with the width of die orifice 5 as measured in the horizontal direction. The thickness of the resin passageway 8 is gradually increased to 3 or more times the thickness of die orifice 5 up to a distance one-half of the length of the passageway on its inlet side and is then gradually reduced in the remaining zone but is not less than 3 times the thickness of the die orifice 5. The reference numeral 9 indicates a plurality of channels or passageways bored along the passageway 8 and a cooling medium circulates through said channels so as to cool the wall of resin passageway 8.

The resin-forming agent composition is extruded from the die orifice 5 in the form of a sheet and, as it enters the resin passageway 8, the sheet is comparatively abruptly allowed to expand mainly in its thickness direction near the inlet end of said passageway 8 and, at the same time, the surface of the sheet is cooled. Thereafter, as it is still cooled, the sheet is gradually reduced in thickness. After passing through the resin passageway 8, the resin is exposed to the ambient atmosphere. Within the passageway 8 the sheet is externally cooled, but since it is not completely cooled to its intermediate layer, the sheet is usually allowed to further expand in all directions after emergence from the passageway 8. However, it is not always true that the sheet expands after its emergence from the passageway 8. At times the sheet does not expand at all after its emergence from passageway 8. The sheet is then taken out by a pair of take-up rollers.

Figure 2:
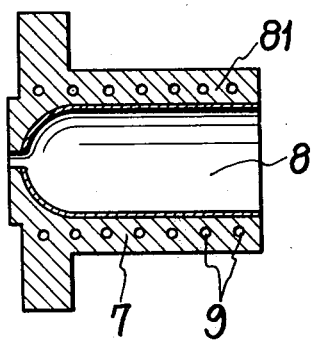
FIGS. 2 and 3 are respectively another vertical section showing diagrammatically another example of a passageway used in the invented method.
Figure 3:
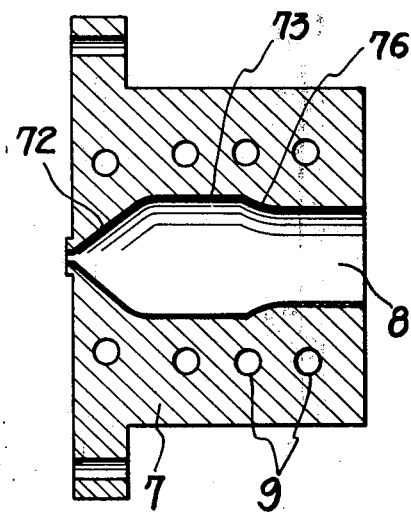

The resin passageway 8 defined by and formed within the member 7 need not be the one illustrated in FIG. 1. It may be one like that schematically illustrated in FIG. 2. FIG. 2 is completely identical with FIG. 1 in that passageway 8 of FIG. 2 is gradually enlarged to more than 3 times the thickness of die orifice 5 at a point up to a distance one-half of its length from the inlet end thereof. In the remaining zone, however, the passageway extends horizontally without its thickness being altered at all. Furthermore, the resin passageway 8 may be one like that illustrated in FIG. 3. In the embodiment of FIG. 3, the passageway 8 is gradually enlarged to more than 3 times the thickness of the die orifice 5 at a point up to one-half of its length from the inlet end thereof and, in the remaining zone, its thickness is first reduced and then maintained in such the dimension toward the exit end that it has been reduced. In any of the above embodiments, the thickness of the passageway 8 is increased to more than 3 times the thickness of the die orifice 5 at a portion up to one-half of the length of the passageway, and in the remaining portion, it is neither further increased, nor is decreased to less than 3 times the thickness of the die orifice 5. To manufacture a sheet which is 10 millimeters or more in thickness, it is preferable to employ a passageway member which has been narrowed in the thickness direction of the sheet at the exit end of the passageway as illustrated in FIG. 1 and FIG. 3.

Referring to FIG. 2 and FIG. 3, the reference numeral 81 indicates a film of fluorine resin provided over the wall facing the passageway 8. Provision of such a film is effective in facilitating the progress of the resin and keeping the surface of the formed article smooth.

Figure 4:
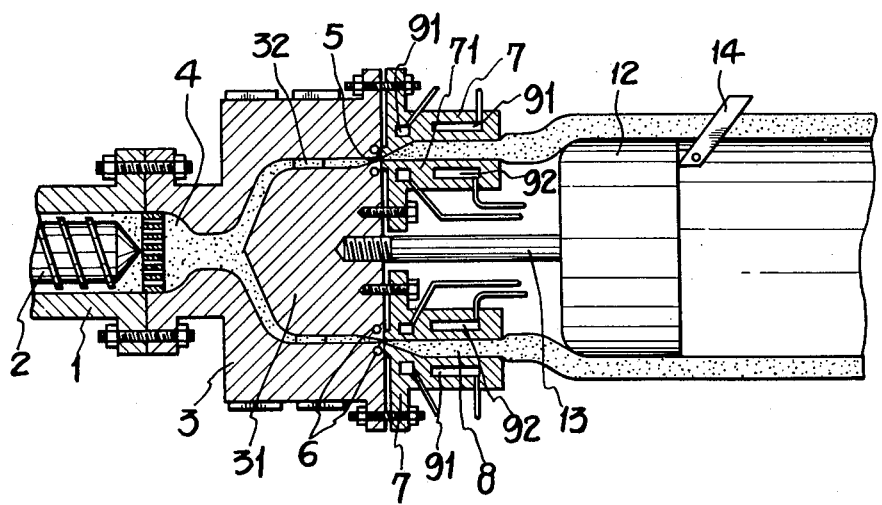
FIG. 4 is a vertical section showing one embodiment of the invented method.

When the die has an annular orifice at its discharge end, the longitudinal cross section of the die and passageway will be as illustrated in FIG. 4. Referring to FIG. 4, reference numeral 1 is an extruder; 2 is a screw. Indicated at 3 is a die. The die 3 of FIG. 4 is different from that 3 of FIG. 1 in that a core 31 has been inserted into the die. The core 31 is supported by a bridging member 32 and, therefore, the orifice is annular as indicated at 5 near the discharge end of the die. The reference numeral 6 indicates a channel through which a heating medium is circulated to heat the die orifice 5. Reference numeral 7 indicated a passageway member disposed adjacent to the die; and 8 indicated a resin passageway defined by and formed within said member 7. This passageway 8 is of an annular structure whose inside diameter approximating that of the die orifice 5. In a cross-section perpendicular to the direction of flow of the resin, the thickness of passageway 8 is greater at any point than the thickness of the die orifice 5. In other words, from the inlet to the exit end, the resin passageway 8 is annular, with its inside diameter being substantially unchanged. The annular passageway is mainly increased in thickness. As regards the increase in thickness, the passageway is enlarged considerably in the portion on inlet side of the passageway and, at the exit side, remains as enlarged in the portion on the inlet side. This enlargement is effected at a point up to one-half of the length of the passageway from the inlet end and the thickness so increased is 3 or more times the thickness of the orifice 5. Even when the cross-section of resin passageway 8 is annular, the thickness of the passageway 8 is increased to 3 or more times that of the die orifice 5 at a distance up to one-half of the entire length of the passageway from its inlet end and, is either gradually reduced from the maximum thickness or first gradually reduced then made constant.

Regarding the passageway member 7, a core 71 is needed to provide an annular passageway 8. This core 71 is centrally disposed and affixed with respect to a die core 31. To cool the wall facing to the passageway 8, there are provided channels 91 and 92 for a cooling medium. Channels 91' and 92' are also provided for cooling medium so that the core 71 will also be cooled to the desired temperature by the medium. Reference numeral 12 indicates a core unit which is adapted to support the annular foamed sheet so produced and is secured to the core 71 by means of a supporting shaft 13. Reference numeral 14 is a cutter adapted to cut the annular foamed article open into a sheet. With use of the apparatus illustrated in FIG. 4, the resin-foaming agent composition is extruded from the orifice 5 in a tubular form, introduced directly into the inlet end of the resin passageway 8, and is allowed to abruptly expand in the thickness direction of the tubular article. Simultaneously, the surfaces of the tube are cooled. Then, the tubular article further progresses in the passageway and is further cooled from both surfaces. The cooled tube of resin emerging from the passageway 8 has not been completely cooled to the inner layer, so that when the tube emerges from the passageway, the tube still expands further to some degree by virtue of the residual pressure of the foaming agent. Thereafter, the tube is further cooled as it passes over the surface of the core unit 12. The tubular resin article is then cut in the axial direction by means of a cutter 14 and opened into the form of a sheet, followed by taking up.

The sheet obtained in the above manner is such that its surfaces have been foamed only to a limited extent or are substantially unfoamed, though its intermediate layer having been highly foamed. Furthermore, as illustrated in FIG. 5, the cells are such that they are fine near the surface layer as indicated at $a$ and nearly spherical, but at the intermediate layer $b$, they are coarse or large and have been elongated in the thickness direction of the sheet. As a result, in the intermediate layer, the resin films forming the cell walls have been oriented in the thickness direction of the sheet and, when the cells are stretched extremely in the thickness direction, the resin film is ruptured to provide an open-cell structure. Therefore, as indicated in FIG. 5, this sheet is gas-permeable to the extent that if one blows air from a lateral side $c$ of the sheet, the air emerges from the opposite side $d$.

The following examples will serve to understand this invention.

EXAMPLE 1

This example was carried out in the manner illustrated in FIG. 4.

As regrads an extruder, use was made of an extruder having an inside diameter of 50 millimeters, and a die having an annular orifice was secured to the forward end of the extruder. The die had an orifice at its discharge end measuring 0.35 millimeter(s) in thickness. Having this thickness, the orifice had an inside diameter of the 100 millimeters.

A passageway member was also mounted on said die. The entire length of said passageway member is 50 millimeters as measured in the direction of flow of the resin. The passageway member consists of an external unit and a core unit and forms an annular passageway therebetween. This passageway has a cross-section substantially comparable to the die orifice at the end adjacent to the die, measuring 0.55 millimeters in width. At the resin exit end, the external diameter of the core unit is 100 millimeters. With the internal diameter of the external cylindrical unit measuring 108 millimeters, and there has been formed an annular gap having a thickness of 4 millimeters. The position where the above thickness is increased from 0.55 to 4 millimeters is within a few millimeters away from the die, and the passageway is enlarged by inclining both outer walls at an angle of 22°. In the remaining zone, the thickness remains unchanged, i.e., 4 millimeters. The internal face of the external cylindrical unit and the external surface of the core unit are covered with tetrafluoroethylene resin having a thickness of 40 microns. Both the external cylindrical unit and the core unit are provided with channels for cooling medium at positions adjacent to the resin covered surfaces. The core unit 12 has an outside diameter of 120 millimeters.

As the resin, polypropylene (Noblen MH-8 by Mitsubishi Yuka Co. Ltd; melt index 0.3) was employed. One-hundred parts by weight of the above resin was compounded with 1 part by weight of talc and the resulting compound was fed to the extruder. The compound was melted within the extruder and then a foaming agent was added to the molten resin. The foaming agent used was butane, and 7.5 parts of butane was added under pressure to 100 parts of the resin. The polypropylene resin containing this foaminng agent was fed into the die at the rate of 10 kilograms per hour. At this moment, the temperature of the extruder was 200° to 240°C, with the temperature at the forward end of the extruder being 145°C. The temperature of the die was 166°C and that at the forward end thereof was 170°C. To cool the resin passageway 8, air at room temperature and water at the same temperature were circulated to the zone adjacent to the die and the exit zone, respectively.

The polypropylene resin emerging from the above passageway assumed the form of a tube which had a wall thickness of 6 millimeters and, upon cutting open, provided a sheet which was 360 millimeters in width. The expansion degree was 20 times on the average. This sheet was such that its two faces had been only slightly foamed while its intermediate layer had been highly foamed. The cells in the intermediate layer had been communicating with each other and some of the cells had been ruptured. When this sheet was immersed in water containing a surface active agent for 24 hours, it absorbed approximately 50 percent by volume of the water (herein-after, thus measured value is referred to as water absorption). The permeability of the same sheet to methanol was 407g/10 min./cm$^2$ , indicating that the sheet had a fairly open-cell structure.

This sheet could be easily split by hand into two pieces of substantially equal thickness. The split face had a dense population of many long wooly projections oriented in the thickness direction of the sheet.

EXAMPLE 2

This example was carried out in a manner as illustrated in FIG. 4, wherein core 12 was used.

There was used an extruder having an inside diameter of 65 mm, and a die having an annular orifice was mounted on the forward end of the extruder. Thickness and diameter of the orifice at the discharge end of the die were 0.35 and 100 mm respectively.

Passageway member mounted on the die had a structure as shown in FIG. 4, and the member was nearly the same as that of Example 1, except that the angle between outer walls at the position wherein thickness of the passageway was increased from 0.55 to 4 mm was 11° (In Example 1 the corresponding angle was 22°).

The same polypropylene as in Example 1 was used, and to 100 weight parts of the polypropylene were added 1 weight part of talc, 0.2 weighed part of sodium bicarbonate and 0.1 weight part of citric acid. The resulting mixture was fed into the extruder and was melted therein, thereafter 13 weight parts of butane was admixed to 100 parts of the mixture. Thus, polypropylene containing butane was supplied to the die at the rate of 10 kg polypropylene per hour. At this stage, the temperature of the extruder was 200°–240°C, the temperature of forward end of cylinder of the extruder was cooled to 130°–135°C, and the temperature of the die was 150°–160°C.

To cool the resin passageway 8, water of the room temperature was circulated in the zone adjacent to the die and also in the zone at the discharge side.

The polypropylene emerging from said passageway was allowed to pass over core 12 having outside diameter of 160 mm, and assumed the form of a tube having a thickness of 4.5 mm. When said tube was cut open, a sheet having a width of 425 mm was obtained.

The sheet had an average expansion degree of 39 times. The sheet was such that front and back surface layers were slightly foamed but had no permeability to the air, while the intermediate layer was foamed to high degree. The pores in the intermediate layer had been communicating with each other and pore walls had been ruptured. This sheet had water absorption rate of 30 volume percent, and methanol permeability of 15.5g/10 min./cm$^2$.

This sheet had a property to be easily split into two pieces along the middle part in the thickness direction. The sheet was split into two pieces by slicing machine to obtain two sheets having an appearance of an fur in which many long projections grew thickly.

EXAMPLE 3

Figure 7:
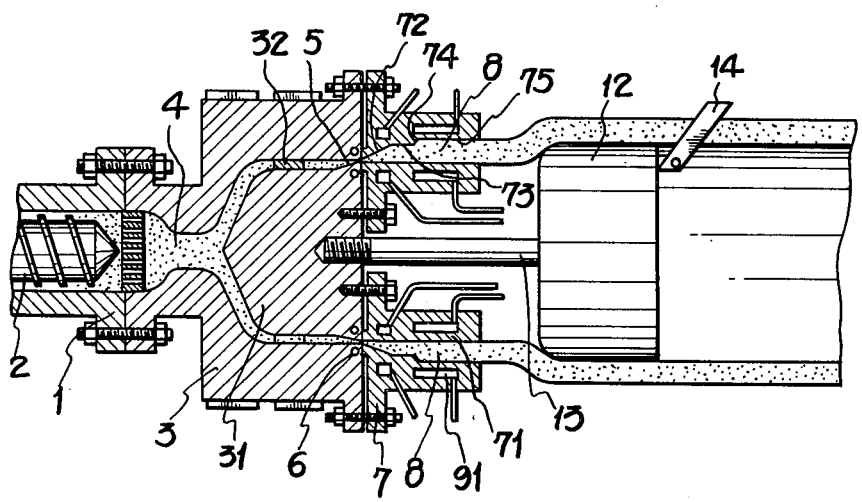

This example was carried out by using the same extruder and die as in Example 1. Butane was added as a foaming agent, however, an amount of butane was slightly increased and the temperature of resin was also slightly varied compared with Example 1. Channel or passageway member mounted on the die was greatly varied. The manner in which this example was carried out is just illustrated in FIG. 7.

The die having an annular orifice was mounted on the discharge end of the extruder having inside diameter of 50 mm, the annular orifice having inside diameter of 100 mm and thickness of 0.33 mm at the discharge end of the die.

The passageway provided in close contact with the die was also annular in the cross-section, and had the shape of the same diameter and almost the same thickness as those of the die orifice at the inlet end of the passageway, the thickness being 0.55 mm. The passageway at the outlet end had inside diameter of 100 mm and outside diameter of 111.4 mm and accordingly thickness of 5.7 mm. The manner in which the thickness of the passageway was increased was that outside diameter of core 71 which constituted inner wall of the passageway was maintained in the same size along the advancing direction, while inside diameter of outside member which constituted outside wall of the passageway was increased at two positions 72 and 74. That is, at charge end 72, the thickness of the passageway was first increased from 0.55 to 4.7 mm by inclining two outside opposing walls at the angle of 30°, thereafter the passageway had paralled portion 73 having the thickness of 4.7 mm. Then at portion 74, the thickness of the passageway was abruptly increased from 4.7 to 5.7 mm by inclining two opposing outside walls at the angle of 90°, thereafter the passageway had parallel portion 74 having the thickness of 5.7 mm and length of 60 mm. Wall surfaces of the passageway were all covered with polytetrafluorethylene, and channels or passageways for cooling medium were provided in the outside member and the core.

Using above mentioned apparatus, the resin mixture as that of Example 1 was fed into the extruder. The resin was melted by maintaining the resin at the temperature of 200°–240°C in the extruder, and 8 weight parts of butane was added to the resin in the extruder per 100 weight parts of resin. Thus, polypropylene containing butane was supplied to the die at the rate of 10 Kg/hour. Forward end of the extruder was cooled to the temperature of 150°–155°C, and the die was maintained at the temperature of 165°–170°C. Further, to cool passageway 8, air of room temperature was circulated in the zone adjacent to the die and water of room temperature in the zone at the discharge side. Core 12 used in this example had outside diameter of 120 mm.

Thus a foamed polypropylene pipe was obtained having the thickness of 5.7 mm. Then the pipe was cut open by knife 14, a sheet having the width of 350 mm was obtained. The sheet was expanded to 16 times on average, and had slightly foamed front and back surgace layers which had no permeability to the air, while the sheet had intermediate layer which was foamed to high degree. Pores in the intermediate layers were communicated with each other and pore walls were ruptured. This sheet showed the water absorption rate of 11 volume percent, and methanol permeability of 216 g/10 min./cm$^2$.

This sheet had a property to be easily split into two pieces along the middle part in the thickness direction, and was split into two pieces by hand. The resulting sheets had an appearance of carpet, the sheet having a multitude of projections which stand thickly in the thickness direction of the sheet.

EXAMPLE 4

This example was carried out as shown in FIG. 4 and accordingly in the same manner as in Example 3, except that dimensions of die and passageway were increased compared with those of Example 3.

There were used the extruder having inside diameter of 65 mm and the die having an annular orifice which had inside diameter of 190.1 mm and thickness of 0.35 mm at the resin discharge side. Passageway was provided in close contact with orifice of the die, and the passageway was formed by outside tube 7 and core 71 which was located in the tube 7. The passageway had the length of 100 mm, the thickness of 0.6 mm at the side adjacent to the die was nearly equal to the thickness of the die orifice, however, the passageway had the thickness of 6 mm at the discharge side by enlarging inside diameter of outside tube 7 to 202 mm and by maintaining outside diameter of core 71 unchanged length of 190 mm, and accordingly there was formed an annular gap having the thickness of 6 mm.

As regrads the resin, there was used a mixture of 100 weight parts of polypropylene (trade mark: Noblen MH-8, manufactured by Mitsubishi Yuka Co.), 3 weight parts of polyethylene (trade mark: Sumikasen F 702, manufactured by Sumitomo Kagaku Co., melt-index 7) and 1 weight part of fine powdery talc.

Above mixture was fed into the extruder, and melted by maintaining the temperature at 200°–240°C, and the foaming agent was pressed into the mixture. As to the foaming agent, 7 weight parts of butane was used per 100 weight parts of the mixture, and the resulting mixture was supplied to the die at the rate of 20 Kg/hour. Forward end of the extruder cylinder was cooled to the temperature 160°–165°C. The die was maintained at the temperature of 165°–170°C. To cool passageway 8, oil at the temperature of 130°C was circulated in the passageway member at the side adjacent to the die, and water at room temperature was also circulated in the passageway member at the discharge side. Core 12 having outside diameter of 230 mm was used.

Thus a foamed resin pipe having the thickness of 6.0 mm was obtained, and when the pipe was cut open by kife 14, a flat sheet having the width of 640 mm was obtained. The sheet had front and back layers which were low expanded and had no permeability to the air, while the sheet had inner layer which was highly expanded and pores formed therein communicated with adjacent pores. The sheet showed water absorption ratio of 25 volume percent, and methanol permeability of 233g/10 min./cm$^2$.

The sheet can be easily split into two sheets, and the resulting sheet had an appearance of carpet.

A pressure sensitive adhesive was applied on the flat surface of the resulting sheet. As regards the pressure sensitive adhesive, it was the mixture of 100 weights parts of pale crape, 50 weight parts of estergum, 2 weight parts of anti-deteriorating agent, which was dissolved in 800 weight parts of benzene to form benzene solution. The benzene solution was applied on the flat surface of the sheet, and then benzene was evaporated.

A releasing paper was attached to the adhesive applied surface of the sheet. The used releasing paper was prepared by applying on a kraft paper a homogeneous solution which comprises 10 weight parts of polyvinyl alcohol, 2 weight parts of potassium stearate and 100 weight parts of water, and then by evaporating the water.

In use, the releasing paper was first peeled off from the adhesive sheet to expose the pressure sensitive layer, and the adhesive layer was pressed to a concrete surface, then the adhesive sheet became to adhere to the concrete surfaces, and accordingly the sheet could be used as a flooring alike carpet.

EXAMPLE 5

Figure 8:
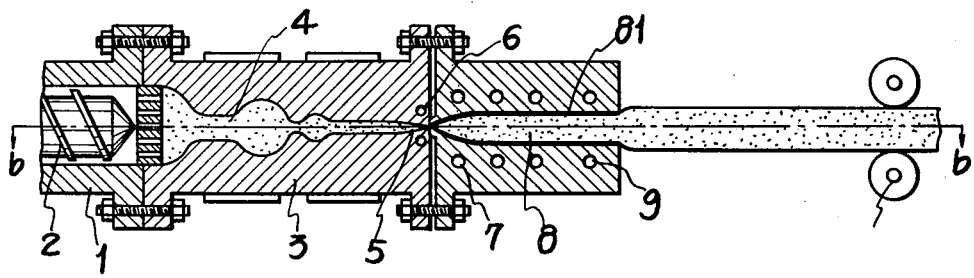
Figure 8:
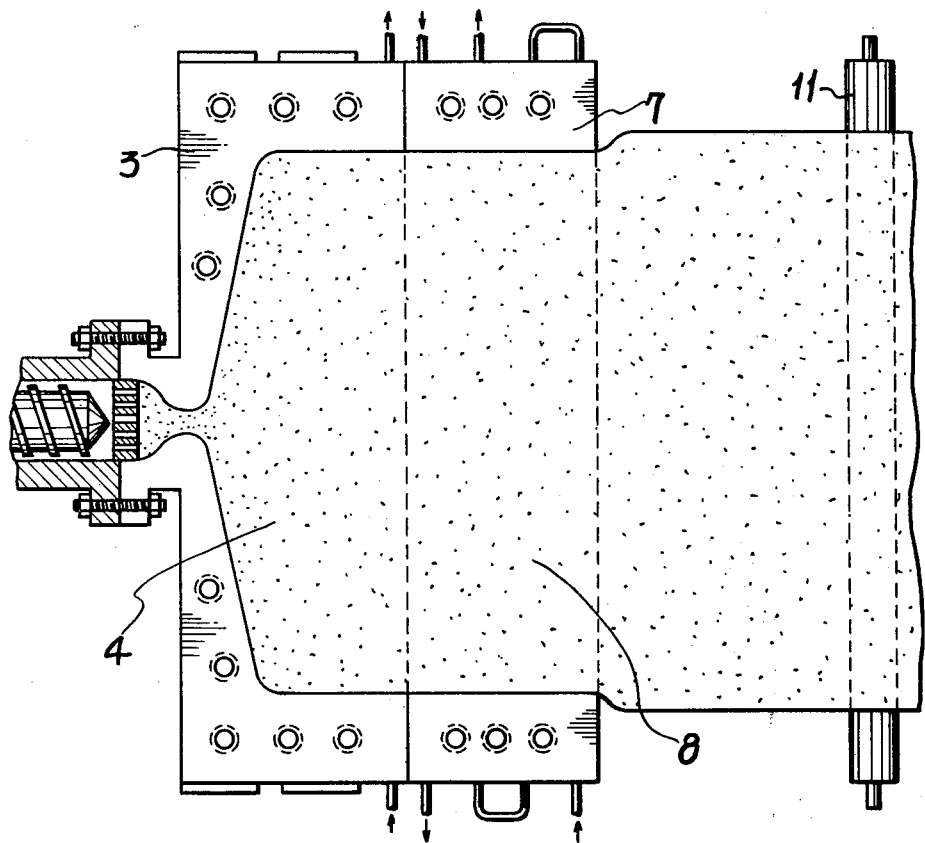

This example was carried out by using a die having a linear orifice, which was 0.5 mm in thickness and 150 mm in width at the resin discharge end of the die. Particulars of carrying out this example is shown in FIG. 8 (a) and (b).

Passageway member 7 had an entire length of 65 mm, wherein a passageway in the form of plate was provided. The passageway had the thickness of 1.0 mm and the width of 152 mm at the end in close contact with the die. The passageway was increased in the thickness and remained unchanged in the width with advancing to the discharge end, at which it had the thickness of 10 mm. Enlargement of the passageway thickness from 1.0 to 10 mm occurred in the portion within a few mm from the end adjacent to the die, and the passageway was enlarged by inclining both outer walls at an angle of 20°. In the remaining zone, the thickness remained unchanged. The passageway walls were all covered with tetrafluoroethylene resin, and channels for cooling medium were provided in the walls.

As for the resin, the same compound as in Example 1 was used and fed into the extruder. In the extruder, the resin compound was heated to the temperature of 200°–240°C and was melted. 10 weight parts of butane was pressed into the 100 weight parts of the melted compound, and the resulting mixture was supplied to the die at the rate of 7 Kg/Hr. Cylinder forward end of the extruder was maintained at the temperature of 140°–145°C by cooling, and the die was maintained at the temperature of 165°–170°C. To cool the resin passageway, air and water of room temperature were circulated in the portion adjacent to the die and at discharge side respectively.

The formed article emerging from the passageway was taken up by a pair of rolls and thus obtained a sheet having the thickness of 10 mm and the width of 170 mm.

The sheet had front and back surface layers which were low expanded and had no permeability to the air, while the sheet hand the intermediate layer which was highly expanded and pores formed therein were ruptured and communicated with adjacent pores, therefore the intermediate layer had bit permeability to the air. The sheet showed water absorption ratio of 18 volume percent, and methanol permeability of more than 300 g/10 min./cm².

The sheet was split into two sheets, and the resulting sheet had a multitude of projections on the splitted surface as if they had been manufactured by electropopulation or flocking.

EXAMPLE 6

This example was carried out by using a die having a linear orifice and a passageway member 7 as shown in FIG. 3.

There was used the extruder having inside diameter of 50 mm. The die had the linear orifice measuring 0.6 mm in thickness and 100 mm in width at the discharge end. The passageway member 7 shown in FIG. 3 is almost similar to that of FIG. 8, however, the former is different from the latter in that the thickness is reduced in a part after it had been once enlarged. Stating concretely, the passageway of FIG. 3 has the thickness of 1.0 mm and width of 101 mm at the end adjacent to the die, while it has the thickness of 9 mm and width of 101 mm at the discharge end. In the course of the passageway, enlargement of the thickness occurs once in portion 72 adjacent to the die, wherein outer walls of passageway incline at the angle of 90° to enlarge the thickness of the passageway to 12 mm. Following the enlargement at portion 72 there is a parallel portion 73. The parallel portion 73 ends at the position 35 mm away from the discharge end, then from the position there occurs gradual reduction with roundness in the thickness of the passageway, and at last there is a parallel portion having the thickness of 9 mm. Walls of the passageway was all covered with tetrafluoroethylene resin, and channels for cooling medium were provided adjacent to the walls.

The same resin as in Example 1 was used, which was blended with same amount of the talc as in Example 1. The resulting resin was treated in the same manner as in Example 1, except that 6 weight parts of butane was used, 8 Kg of resin containing butane per hour was supplied to the die, the temperature of the die was maintained at 155°–160°C, and water of room temperature was corculated in order to cool the passageway.

The resin emerging from the passageway was taken up by two sets of paired rolls, and thus obtained a sheet having the thickness of 12 mm and the width of 120 mm. The sheet had low expanded surface layers and highly expanded intermediate layer. The surface layers had no permeability to the air, while the intermediate layer had considerable permeability. The sheet was expanded to 17 times on average. The sheet showed the water absorption of 26 volume percent, and the methanol permeability of 185 g/10 min./cm².

Thus obtained sheet was easily split into two sheet by hand, and the resulting sheet had an appearance of carpet.

EXAMPLE 7

This example was carried out by using the same extruder, die and passageway member and also in the same manner as in Example 1, except that polyamide resin was used instead of polypropylene, and accordingly some minor changes were conducted in operations.

As for the material, 100 weight parts of polyamide resin (Nylon X-5021 manufactured by Toray K.K.) was blended with 1 weight part of talc, and the resulting maxture was fed into the extruder. The mixture was melted in the extruder, thereafter butane was pressed in the melted mixture at the rate of 4 weight parts to 100 weight parts of the melted mixture. Thus, the polyamide resin containing foaming agent was supplied to the die. At that time, the temperature of the extruder was 250°–300°C, the temperature of forward end of the extruder 165°C, that of the die 180°C, and that of forward end of the die 170°C. To cool the passageway 8, the air and water at room temperature were circulated in the same manner as in Example 1.

The polyamide resin extruded from the passageway 8 assumed the form of a tube which had the wall thickness of 4 mm, and when it was cut open there was obtained a sheet having the width of 350 mm. The sheet was expanded to 19 times expansion rate on average. The sheet had low expanded surface layers and highly expanded intermediate layer. The surface layers did not show any permeability to the air, while the intermediate layer showed considerable permeability. Pores formed in the intermediate layer were ruptured and communicated with adjacent pores. The sheet showed water absorption of 4 volume percent, and methanol permeability of 93 g/10 min./cm. From these facts it was found that the sheet had considerable amount of communicating pores.

The sheet could be easily split into two sheets, and when it was sliced into two sheets by slicing machine, there was obtained sheets having long projections grown thickly which had an appearance of a fur.

We claim:

1. A resin sheet having an appearance of carpet or velvet which is prepared by splitting off an extruded foamed sheet of a resin along middle portions in the thickness direction thereof to form a surface having a great number of irregular projections standing upright to the surface, said resin being selected from the group consisting of polyolefin and polyamide, said extruded foamed sheet prior to splitting having substantially unfoamed front and back surface layers and a foamed intermediate layer therebetween, said intermediate layer having pores which are of gradually increasing size as the perpendicular distance from either surface approaches the center of said intermediate layer, said pores being increasingly elongated in shape in said perpendicular direction as the distance from either surface approaches the center of said intermediate layer, said pores at the center being ruptured and communicated with each other and the walls of the pores being dispersed in the form of thin films oriented in said perpendicular direction; the extruded sheet thus having a structure such that half portions, front and back, are partly connected to each other by bridges of said thin films, so that the sheet has no permeability in the direction of the thickness, but a considerable permeability in a lateral direction such as to permit more than 15 g of methanol to pass through the sheet per square centimeter thereof in ten minutes.

2. A process for preparing a resin sheet having an appearance of carpet or velvet which comprises extruding a mixture of a foaming agent and a resin selected from the group consisting of polyolefin and polyamide through an orifice of a die, introducing the thus extruded mixture directly into a cooled passage having a width substantially equal to that of the orifice and a thickness which is abruptly enlarged along the length of the passage to more than three times the thickness of the orifice, the abrupt enlargement of the orifice occurring in at least one portion of the passage extending from the portion adjacent to the die to the portion in the midpoint of the passage, and the thickness of the remaining portion after ultimate enlargement being substantially constant or reduced gradually towards the discharge end, cooling the foamable resin sheet from the surface thereof and expanding the sheet primarily in the thickness direction thereof within the passage, thereafter further expanding the sheet immediately after the sheet has passed through the passage, and splitting the resulting foamed sheet along the central part thereof in the thickness direction to form two sheets.

3. A process for preparing a resin sheet, according to claim 2, wherein the resin is a polyolefin.

4. A process for preparing a resin sheet, according to claim 2, wherein the resin is a polyamide.

5. A process for preparing a resin sheet, according to claim 2, wherein the mixture extruded through the orifice expands in the portion of the passage immediately following said extrusion and wherein this expansion of the mixture is the only expansion on an enlarged portion of the passage immediately following the orifice.

6. A process for preparing a resin sheet, according to claim 2, wherein the mixture is expanded in a second enlarged portion of the passage which immediately precedes the orifice.

* * * * *